United States Patent
Kenney et al.

(10) Patent No.: US 10,210,234 B2
(45) Date of Patent: Feb. 19, 2019

(54) LINKING DISCRETE DIMENSIONS TO ENHANCE DIMENSIONAL ANALYSIS

(75) Inventors: Andrew Kenney, Scottsdale, AZ (US); Carlyn Evans, Ann Arbor, MI (US)

(73) Assignee: JDA Software Group, Inc., Scottsdale, AZ (US)

( * ) Notice: Subject to any disclaimer, the term of this patent is extended or adjusted under 35 U.S.C. 154(b) by 228 days.

(21) Appl. No.: 12/409,180

(22) Filed: Mar. 23, 2009

(65) Prior Publication Data

US 2009/0254583 A1 Oct. 8, 2009

Related U.S. Application Data

(60) Provisional application No. 61/038,904, filed on Mar. 24, 2008.

(51) Int. Cl.
*G06F 17/30* (2006.01)

(52) U.S. Cl.
CPC .............. *G06F 17/30592* (2013.01)

(58) Field of Classification Search
CPC ............. G06F 17/248; G06F 17/30038; G06F 17/30056; G06F 17/30867; G06F 9/465; G06F 17/274; G06F 17/30017; G06F 17/3028; G06F 3/015
USPC ........ 707/999.005, 999.1, 999.102; 715/853, 715/848, 214, 764
See application file for complete search history.

(56) References Cited

U.S. PATENT DOCUMENTS

| | | | |
|---|---|---|---|
| 7,356,779 B2 * | 4/2008 | Cras et al. ................... | 715/853 |
| 7,392,248 B2 * | 6/2008 | Bakalash et al. | |
| 7,774,303 B2 * | 8/2010 | Shoup et al. ................. | 707/604 |
| 2003/0023608 A1 * | 1/2003 | Egilsson et al. .............. | 707/100 |
| 2004/0044665 A1 * | 3/2004 | Nwabueze ...................... | 707/9 |
| 2004/0064456 A1 | 4/2004 | Fong et al. | |
| 2004/0133597 A1 * | 7/2004 | Fano ..................... | G06F 17/248 |
| 2004/0139045 A1 * | 7/2004 | Vierich et al. .................... | 707/1 |
| 2005/0004918 A1 * | 1/2005 | Platt .............................. | 707/100 |
| 2005/0015360 A1 | 1/2005 | Cras et al. | |
| 2006/0010159 A1 * | 1/2006 | Mirchandani ..... | G06F 17/30592 |
| 2006/0136417 A1 * | 6/2006 | Avinash ............ | G06F 17/30017 |
| 2007/0078873 A1 * | 4/2007 | Avinash ............. | G06F 17/3028 |

(Continued)

OTHER PUBLICATIONS

International Search Report for International (PCT) Application No. PCT/US09/37926, dated May 13, 2009.

(Continued)

*Primary Examiner* — Syling Yen
*Assistant Examiner* — Bao G Tran
(74) *Attorney, Agent, or Firm* — Spencer Fane LLP; Steven J. Laureanti

(57) ABSTRACT

Not all facts in a data warehouse are described by the same set of dimensions. However, there can be associations between the data dimensions and other dimensions. By maintaining a set of relationships that are capable of linking the dimensional keys used in existing data to the keys of an associated dimension, a data transformation can be constructed that summarizes by the original and by the associated dimensions in feeds in an analytical data mart (cube) that includes all the dimensions. This cube can then be consolidated and analyzed in a slice-and-dice fashion as though all the dimensions were independent. Data transformed in this manner can be analyzed alongside data from a source that is keyed by all of the dimensions.

19 Claims, 4 Drawing Sheets

(56) References Cited

U.S. PATENT DOCUMENTS

2009/0018996 A1\* 1/2009 Hunt et al. ................ 707/2
2009/0172023 A1\* 7/2009 Shteyngarts et al. ...... 707/104.1
2009/0254583 A1\* 10/2009 Kenney ............ G06F 17/30592

OTHER PUBLICATIONS

Written Opinion for International (PCT) Application No. PCT/US09/37926, dated May 13, 2009.

\* cited by examiner

Fig. 4

| Variables: | BOP_Rtl | Rec_Rtl | Sls_Rtl | TotMD_Rtl | Shr_Rtl | Adj_Rtl | EOP_Rtl | | | | | | | | | |
|---|---|---|---|---|---|---|---|---|---|---|---|---|---|---|---|---|
| | | | | | | | | Wk09_2009 3/1/2009 | Wk10_2009 3/8/2009 | Wk11_2009 3/15/2009 | Wk12_2009 3/22/2009 | Wk13_2009 3/29/2009 | Wk14_2009 4/5/2009 | Wk15_2009 4/12/2009 | Wk16_2009 4/19/2009 | Wk17_2009 4/26/2009 |
| Item100001 | Last Year | T:ISeasonality | | | | | | 90.00 | 93.00 | 95.00 | 98.00 | 101.00 | 99.00 | 97.00 | 95.00 | 92.00 |
| | | Spring | | | | | | 90.00 | 93.00 | 95.00 | 98.00 | 101.00 | 99.00 | 97.00 | 95.00 | 92.00 |
| | | Fall | | | | | | ? | ? | ? | ? | ? | ? | ? | ? | ? |
| | This Year | T:ISeasonality | | | | | | 101.00 | 103.00 | 105.00 | 107.00 | 105.00 | 102.00 | 104.00 | 107.00 | 110.00 |
| | | Spring | | | | | | 101.00 | 103.00 | 105.00 | 107.00 | 105.00 | 102.00 | 104.00 | 107.00 | 110.00 |
| | | Fall | | | | | | ? | ? | ? | ? | ? | ? | ? | ? | ? |
| | Working Plan | T:ISeasonality | | | | | | 95.00 | 100.00 | 105.00 | 110.00 | 105.00 | 100.00 | 105.00 | 105.00 | 110.00 |
| | | Spring | | | | | | 95.00 | 100.00 | 105.00 | 110.00 | 105.00 | 100.00 | 105.00 | 105.00 | 110.00 |
| | | Fall | | | | | | ? | ? | ? | ? | ? | ? | ? | ? | ? |

400

410 420 430 440

LINKING DISCRETE DIMENSIONS TO ENHANCE DIMENSIONAL ANALYSIS

RELATED APPLICATION DATA

This application claims the benefit of and priority under 35 U.S.C. § 119(e) to U.S. Patent Application No. 61/038,904, filed Mar. 24, 2008, entitled "Linking Discrete Dimensions To Enhance Dimensional Analysis," which is incorporated herein by reference in its entirety.

FIELD OF THE INVENTION

One exemplary aspect of this invention generally relates to the field of dimensional data warehouses and data marts. More specifically, an exemplary embodiment relates to a database structure utilizing a multidimensional cube.

BACKGROUND

Data Warehouses are commonly designed using Dimensional Modeling. Such a Data Warehouse is known as a Dimensional Data Warehouse. Typically data in a Dimensional Data Warehouse is stored in fact tables that connect to dimension tables in a design known as star-schema. Sourced from the base data in star-schemas, multidimensional structures called Online Analytical Processing (OLAP) cubes are often built for analysis and reporting purposes.

The base data in a Dimensional Data Warehouse is stored in a Relational database. Relational databases use a collection of relations e.g. tables, to define a relational model to which the relational database conforms. In relational databases, the data is typically accessed through the use of a Structured Query Language (SQL) type query.

The OLAP cubes may be implemented in a relational database. This is known as Relational OLAP (ROLAP), or in a multidimensional database environment, as Multidimensional OLAP (MOLAP).

In OLAP, the structure of the database allows rapid processing of the data such that queries can be answered quickly with reduced processor burden. This is facilitated by the use of a data cube which represents the dimensions of data available. For example, "Sales" could be viewed in the dimensions of Item, Product, Geography, Time, or some additional dimension. In this case, "Sales" is referred to as the measure attribute of the data cube and the other dimensions are referred to as the feature attribute. A database creator can also define hierarchies and levels within a dimension, such as cosmetics-skin care products-lotion, with an associated hierarchy within the dimension.

SUMMARY

Understanding a product's repeatable seasonal pattern is critical to interpreting historical sales and subsequently generating an accurate forecast of future demand. Achieving optimized replenishment requires accurate seasonal profiles coupled with strategic analysis. In order to follow sound forecasting practices, one should have a clear-cut representation of the selling curve for a time period, for a product and for a location. Without such profiles, a forecast could confuse the elevated levels of business that might occur during the holiday season, for example, with a high growth trend, and then accelerate the receipt of products to unrealistic levels in January.

One exemplary embodiment of the invention utilizes these advanced techniques and computing power to produce profiles at low levels of the product hierarchy, on, for example, a location-by-location basis and with indications of individual location/product time curves. This exemplary embodiment can also automatically revise profiles in-season using new performance data. The numerical techniques used allow accurate profiling even for low-volume and low frequency items, all implemented using automation for review of tens to hundreds of millions of location/SKU sales combinations.

Another exemplary aspect of this invention generally relates to the field of dimensional data warehouses, and specifically to the challenges of analyzing data of different, but related, dimensionalities. Not all facts in a data warehouse are described by the same set of dimensions. However, there can be associations between the dimensions associated with the database and other dimensions. A difficulty exists in how to present aggregated data in an OLAP cube with a consistent set of dimensions that can incorporate data with different defining dimensionality.

Current solutions involve assigning associated dimension members in the feed of information coming to the data warehouse so that the data to be analyzed together has a consistent set of dimensionalities. However, there are several drawbacks associated with this approach. For example, additional processing on large volumes of data needs to be undertaken. Furthermore, the analytical needs must be anticipated at the time of preparing the data feeds or, if identified later, the data feeds may need to be re-written and previously-loaded data re-organized to assign additional dimension keys. Additionally, the additional dimension keys and data records increase the size of typically what are the largest tables in the data warehouse.

By maintaining a set of relationships that are capable of linking the dimensional keys used in the existing data to the keys of the associated dimension, a data transformation can be constructed that summarizes by the original and by the associated dimensions in feeds to an OLAP cube that includes all the dimensions. This cube can then be consolidated and analyzed in a slice-and-dice fashion as though all the dimensions were independent. Data transformed in this manner can be analyzed alongside data from a source that is keyed by all of the dimensions.

Thus, for an end user, this solution is capable of adding value to an existing dimensional data warehouse. Therefore, analytical needs that were not previously possible can be accommodated without prohibitive reloading, rebuilding, and without a corresponding increase in size of the data tables in the data warehouse. For a software vendor, it also advantageously provides a growth path as additional application components are developed that avoids rework of existing features and an easy migration path for prospective customers.

One exemplary OLAP solution utilizes a multi-cube approach, in which the multi-cube comprises a series of small pre-calculated cubes. These pre-calculated cubes are sometimes referred to as a hypercubes. This structure facilitates the slice-and-dice of information therefore providing the ability of a multidimensional analysis through the use of the data cube and can be used with the features of this invention.

For example, OLAP can be the basis of an analysis tool that allows quick and ready analysis of questions that involve, for example, a timeline. Other environments in which OLAP has advantages are if the questions relate to geographical areas, various product lines, categories and/or channels. For example, as will be discussed herein, OLAP can allow a user to align and analyze data relating to the number of products sold, sales location, and season within a given planning cycle, or in general, any metric.

Accordingly, exemplary aspects of the invention relate to a database structure utilizing an OLAP cube.

Still further aspects of the invention relate to combining dimensions and data aggregation in a database environment.

Still further aspects of the invention relate to a dimensioned data warehouse that comprises original data with dimension keys and a relationship that links the dimension keys to new dimension keys to generate a new multidimensional cube.

Even further aspects of the invention relating to utilizing rules to tag data with a dimension code.

Still further aspects of the invention relate to utilizing a template to select a rule set that tags data with dimension codes.

Additional aspects of the invention relate to building an analytical cube with additional dimensions that can be used for one or more of data analysis, feedback for demand chain management, reporting, or the like.

Still further aspects of the invention relate to establishing one or more relationships between existing data that includes dimensional keys and one or more new dimensional keys.

Aspects of the invention also relate to collecting base data, analyzing and tagging the base data with keys corresponding to a dimension based on one or more rules, aggregating by the original and new keys, constructing a multidimensional cube with additional dimensions for data analysis, and slicing-and-dicing of the data. The base data can relate to and represent one or more of products and services, such as a coat, cold medicine, hotel room, winterizing car service, or the like.

Even further aspects of the invention relate to providing a user interface comprising dimensioned data, where one of the dimensions may not have been loaded with the data.

Another aspect of the invention provides an output, such as a user interface, with data representing one or more of a product and service with one or more additional dimensions.

Still further aspects of the invention relate to outputting information representing one or more of a product and service with one or more additional dimensions.

Still further aspects of the invention relate to outputting information representing one or more of a product and service with one or more additional relationships.

The preceding is a simplified summary of the summary of the invention to provide an understanding of some aspects thereof. This summary is neither an exhaustive nor extensive overview of the invention and its various embodiments. It is intended neither to identify key or critical elements of the invention nor to delineate the scope of the invention, but to present selected concepts of the invention in a simplified form as an introduction to the more detailed description presented below. As will be appreciated, other embodiments of the invention are possible utilizing, alone or in combination, one or more of the features as set forth above or described in detail below.

BRIEF DESCRIPTION OF THE DRAWINGS

FIG. 4 represents an exemplary seasonality summary according to this invention.

DETAILED DESCRIPTION

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in providing instructions to a processor for execution. Such a medium may take many forms, including but not limited to, non-volatile media, volatile media and transmission media. Non-volatile media includes, for example, NVRAM, or magnetic and/or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes or deformation, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

Figure 1:
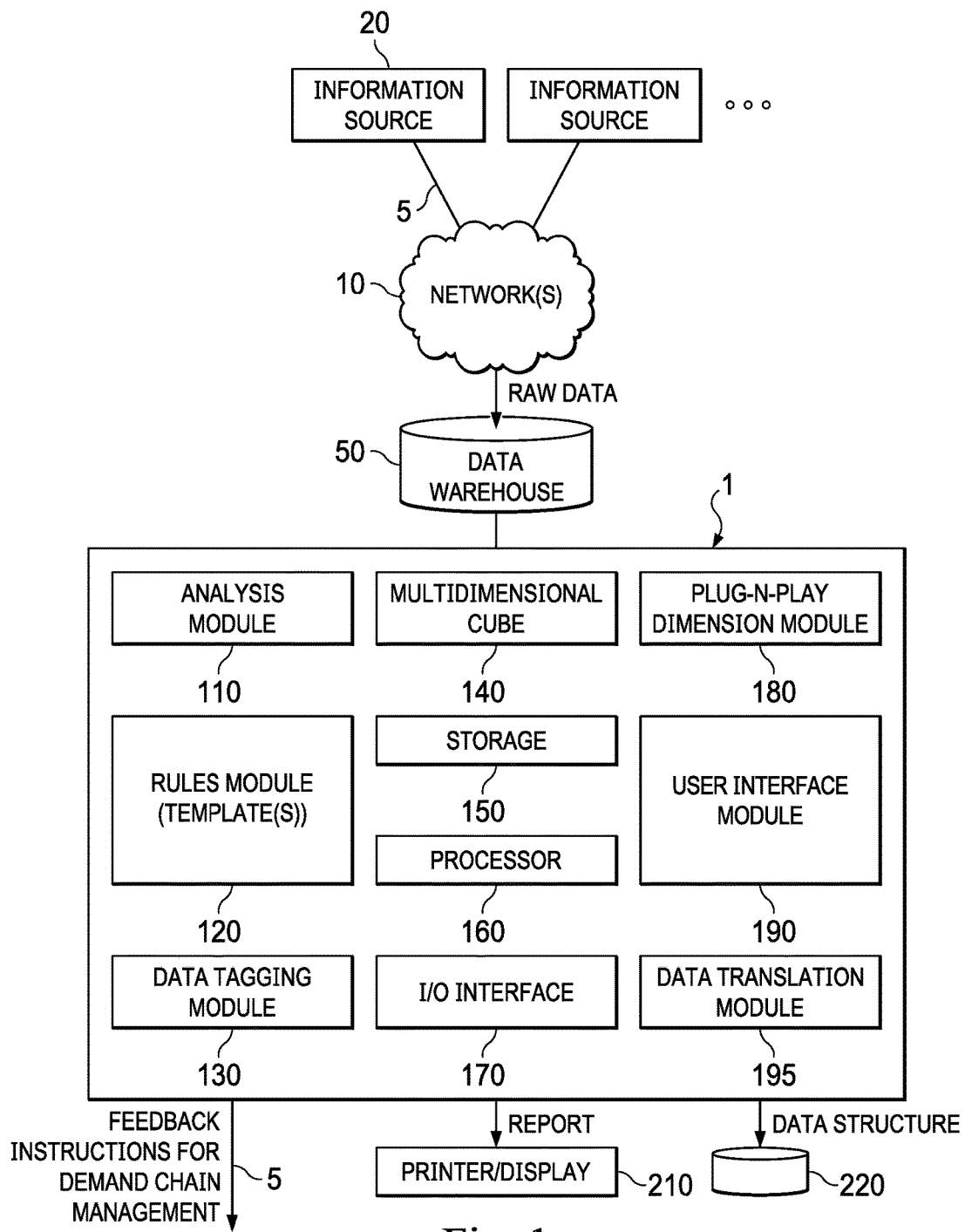
FIG. 1 illustrates an exemplary data analysis system according to this invention.

FIG. 1 illustrates an exemplary data analysis system. The data analysis system comprises one or more information sources 20, a data warehouse 50, and the data analysis system 1, linked by one or more links 5 and networks 10.

The data analysis system 1 comprises an analysis module 110, a rules module 120, a data tagging module 130, a multidimensional cube(s) 140, storage 150, a processor 160, I/O interface 170, a plug-n-play dimension module 180, a user interface module 190 and a data translation module 195.

The data analysis system 1 is at least capable of outputting one or more of feedback instructions for demand chain management, reports to, for example, a printer and/or display 210, and a data structure, such as a multidimensional cube, which can then be stored on storage device 220.

In operation, base data is collected from one or more information sources 20. This information is forwarded, via one or more of links 5 and networks 10, to the data warehouse 50. The data warehouse 50 stores the base data in, for example, the format d1, d2, d3, m1, m2, m3, where d1, d2 and d3 are dimension keys and m1, m2 and m3 are measures. The base data can include various information such as SKU, outlet, time frame, sales, or in general any information that can be collected by the one or more information sources 20. This information can represent such things as products or services, and information related thereto such as location, quantity, sales, price, coupon usage, and in general any information that is related to the product or service.

Next, in cooperation with the user interface module 190, the analysis module 110 and the rules modules 120, one or more rule sets are selected that are used as a basis for tagging the base data with one or more additional dimension keys. Optionally, the data translation module 195 can also convert the data as need to ensure inter-consistency and compatibility with the rule set(s). The rule sets are used to identify one or more features in the data and, if these feature(s) exist, that record(s) is selected for subsequent tagging. For example, user interface module 190 can provide a set of templates, which have a corresponding set of rules, which allow for the tagging of certain dimension keys that have a corresponding desired relationship that is to be analyzed. For example, a "Seasonality Template" could be used for determining the sales of a product during a certain time frame, e.g., fall. This seasonality dimension will have a corresponding rule set that includes, for example, product identifier, time frame, date of sale, retail outlet code, custom information or the like.

Therefore, when the seasonality template is selected via the user interface module 190, the rules module, in conjunction with the data tagging module 130, analyzes the base data in conjunction with the analysis module 110 and tags the additional dimension keys based on the rule set(s). For example, the base data may have dimension keys d1, d2, d3 and the additional dimension keys can be e1, e2, . . . with the rule set(s) that associate instances of d1 and d3 with instances of e1 and instances of d2 and d3 with e2, resulting in a data structure dimensioned by d1, d2, d3, e1, e2.

The analysis module 110 then aggregates by the original keys (d1, d2, d3) and the new keys (e1, e2) with the resultant set being d1, d2, d3, e1, e2, m1, m2, m3.

The multidimensional cube 140 is then formed with dimensions (d1, d2, d3, e1, e2) and can be used for supplemental data analysis. For example, slice-and-dice analysis and consolidation can be performed through the various dimensions as if the dimensions were independent.

The plug-n-play module 180, in cooperation with the user interface module 190, and the rules module 120, allows the selecting of various different dimensions as well as the ability to create new dimensions and corresponding rules. For example, and in conjunction with the user interface module 190, various different dimensions can be selectable by a user with, as each new dimension is selected, the process in FIG. 3 implemented for analysis of the base data.

For example, various types of base data could have been collected. However, this base data may have not been collected to reflect a particular event of interest. For example, an analysis may require a reviewing of product performance, seasonality or promotion effectiveness, or other criteria that may have not been recognized during the base data collection. In order to avoid reloading and reanalyzing of the data, the plug-n-play dimension module 180 allows for additional dimensions to be analyzed with the additional dimension keys based on the one or more rule sets being appended to the base data.

Having constructed the multidimensional cube 140, it is made available for slice-and-dice analysis, and the results, or portion thereof, can be used for one or more of feedback instructions for demand chain management, for report generation that can be one or more of printed and/or displayed on printer 210, and stored in a data structure, such as data structure 220. This data structure 220 could then itself be used and fed-back into the system to, for example, add an additional dimension or modify an existing dimension, and so on.

Figure 2:
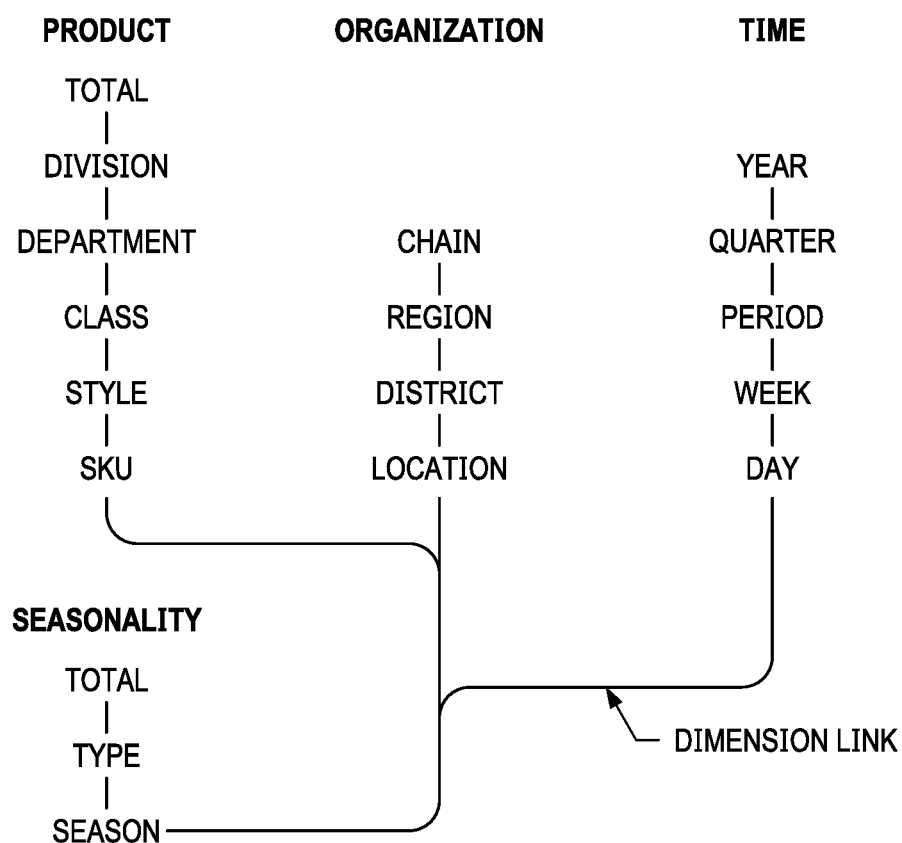
FIG. 2 illustrates an exemplary relationship between primary dimensions according to this invention.

FIG. 2 illustrates an exemplary dimension link that illustrates the relationship between exemplary dimensions Product, Organization and Time and a linked dimension such as Seasonality.

The dimension link connects Product at the SKU level, Organization at the Location level, Time at the Day level to Seasonality at the Season level.

For example, suppose there is a Sales Fact Table in the Data Warehouse with sales measures dimensioned by Product at the SKU level, Organization at the Location level, Time at the Day level and a Seasonal Plan Fact Table also in the Data Warehouse with expense measures dimensioned by Product at Class, Organization at Region, Seasonality at Season level and Time at Week level.

For this exemplary embodiment, the data analysis system 1 can build an OLAP cube with the following dimensions: Product with levels Class and above, Organization with levels Region and above, Seasonality with levels Season and above, Time with levels Week and above. The Expense Fact Table can be used as source data for such a cube. But by means of the dimension link, so can the Sales Fact Table. Through the dimension link sales data is available dimensioned by Product at SKU, Organization at Location, Time at Day and Seasonality at Season. This can be aggregated to Product at Class, Organization at Location, Seasonality at Season, Time at Week and hence is candidate source data for the cube.

Figure 3:
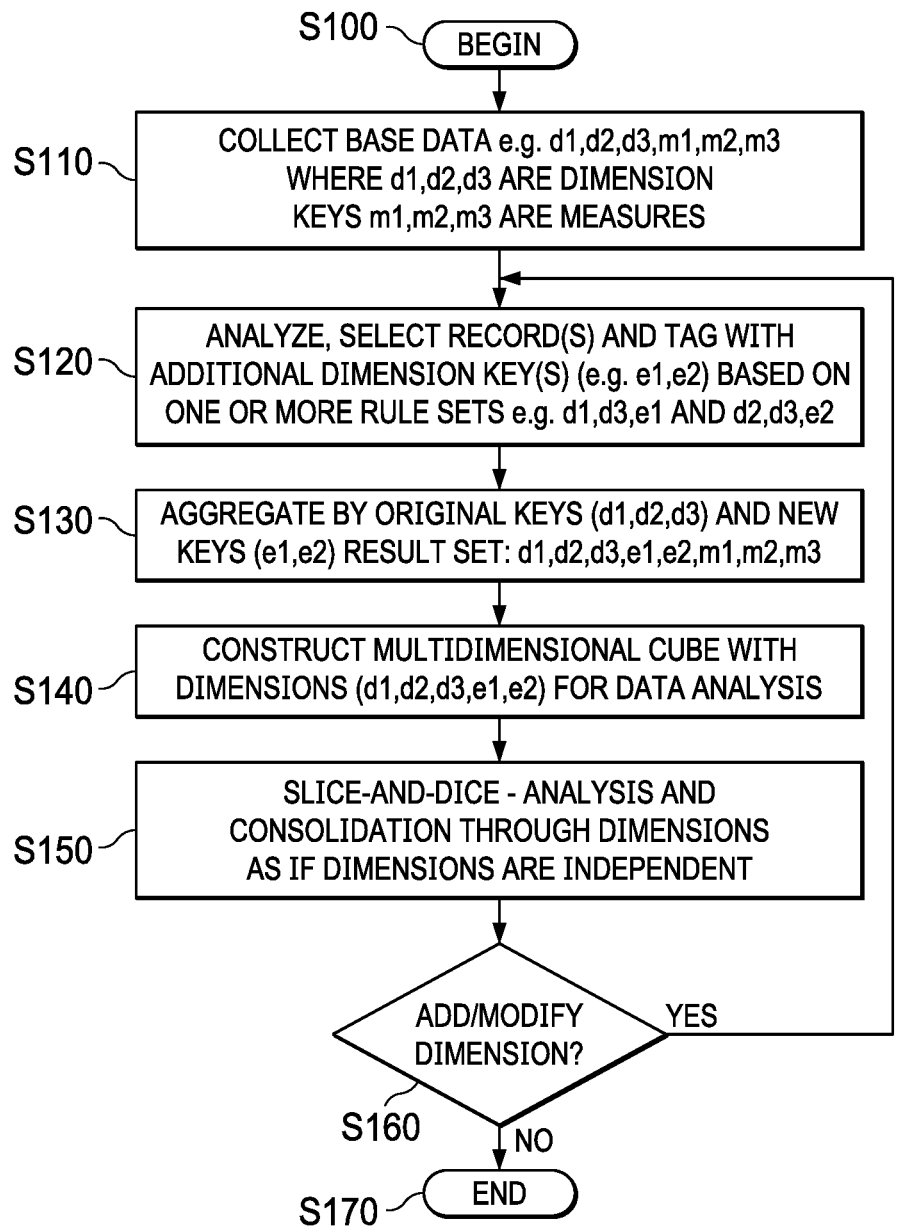
FIG. 3 is a flowchart outlining the exemplary method of linking discrete dimensions to enhanced dimensional analysis according to this invention.

FIG. 3 illustrates an exemplary methodology for linking discrete dimensions according to this invention. In particular, control begins in step S100 and continues to step S110. In step S110, the base data is collected in the form of d1, d2, d3, m1, m2, m3, wherein d1, d2, d3 are dimension keys and m1, m2, m3 are measures. Next, in step S120, the base data is analyzed, one or more records meeting the criteria in the rule(s) is selected and tagged with additional dimension keys, e.g., e1, e2, based on one or more rule sets, e.g., d1, d3, e1 and d2, d3, e2. Then, in step S130, aggregation is performed by the original keys (d1, d2, d3) and new keys (e1, e2) with the resultant set being in the form of d1, d2, d3, e1, e2, m1, m2, m3. Control then continues to step S140.

In step S140, a multidimensional cube is constructed with the dimensions of d1, d2, d3, e1, e2 for data analysis. Next, in step S150, slicing-and-dicing can be performed. This slicing-and-dicing allows analysis and consolidation through the dimensions as though the dimensions were independent.

In step S160, a determination is made whether to add or modify a dimension. If the desire is to add or modify a dimension, control jumps back to step S120, with control otherwise continuing to step S170 where the control sequence ends.

FIG. 4 illustrates an exemplary mockup of "Seasonality" according to this invention. The exemplary output grid 400 shows data for Sales, wherein "?" represents "no value." The first column 410 indicates the chart is for a product called "Item 100001." The second column 420 differentiates Last Year Data (LY), This Year Data (TY) and Working Plan Data. The third column 430 indicates Seasonality, in this example Spring, Fall and the Total of Spring and Fall (TtlSeasonality). The remaining columns 440 show the data for Weeks in March and April.

This particular product changes its Seasonality from Spring to Fall in April 2009. The Last Year values are all in the Spring row because the product had Spring Seasonality last year. The This Year and Working Plan (the plan is for this year) values switch from Spring to Fall from the first week in April.

The exemplary methodology described herein is used to add the Seasonality dimension to the actual results (LY and TY)—this data having been loaded without Seasonality as a dimension. Working Plan on the other hand is dimensioned by Seasonality. The result is the ability to compare data with different original dimensions side by side.

A number of variations and modifications of the invention can be used. It would be possible to provide for some features of the invention without providing others.

The exemplary systems and methods of this invention have been described in relation to databases, data analysis and data structures. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific details set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated that the components of the system can be combined into one or more devices, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in an analytical data tool and/or expert data analysis system.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowchart has been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, enterprise systems, demand chain management systems, handheld devices, and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above.

This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate exemplary embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of linking one or more discrete dimensions through the use of a constructed multidimensional cube to improve performance of computer processing operations, the method comprising:
   collecting, by a computer, base data from one or more entities;
   storing, by the computer, the base data in a format comprising one or more dimension keys in a database;
   providing, by the computer, a set of templates that define one or more rule sets, the one or more rule sets identify criteria in the base data for subsequent tagging and associating an instance of at least one of the one or more dimension keys with an instance of at least one of one or more additional dimension keys;
   when base data is incompatible with the one or more rule sets defined by the set of templates, translating, by the computer, base data to a compatible data structure;
   comparing, by the computer, one or more records of the base data with the criteria of the one or more rule sets to determine whether the one or more records of the base data meet the criteria of the one or more rule sets, wherein meeting the criteria of the one or more rule sets triggers a tagging of the one or more records;
   tagging, by the computer, one or more records of the base data that meet the criteria of the one or more rule sets with one or more additional dimension keys;
   aggregating, by the computer, a single resultant set comprising all of the one or more dimension keys and all of the one or more additional dimension keys, the single resultant set aggregated without rebuilding the format comprising one or more dimension keys in the database;
   constructing a multidimensional cube with the one or more original dimension keys and the one or more additional dimension keys, thereby reducing computational run time of the computer; and
   storing the multidimensional cube in a storage device.

2. The method of claim 1, further comprising adding another dimension key.

3. The method of claim 1, further comprising modifying the one or more additional dimension keys.

4. The method of claim 1, further comprising modifying the one or more original dimension keys.

5. The method of claim 1, further comprising viewing the stored multidimensional cube from one or more different viewpoints.

6. The method of claim 1, further comprising providing a user interface where one or more different dimensions can be selected.

7. The method of claim 1, wherein a dimension is seasonality.

8. The method of claim 1, wherein the base data includes information comprising one or more of SKU, outlet, time frame, sales, price and date.

9. The method of claim 1, further comprising determining and generating multiple different viewpoints based on a user request.

10. A non-transitory computer-readable storage media comprising processor executable instructions that when executed improves performance of computer processing operations and is configured to:
    collect base data from one or more entities;
    store the base data in a format comprising one or more dimension keys in a database;
    provide a set of templates that define one or more rule sets, the one or more rule sets identify criteria in the base data for subsequent tagging and associating an instance of at least one of the one or more dimension keys with an instance of at least one of one or more additional dimension keys;
    when base data is incompatible with the one or more rule sets defined by the set of templates, translate base data to a compatible data structure;
    compare one or more records of the base data with the criteria of the one or more rule sets to determine whether the one or more records of the base data meet the criteria of the one or more rule sets, wherein meeting the criteria of the one or more rule sets triggers a tagging of the one or more records;
    tag one or more records of the base data that meet the criteria of the one or more rule sets with one or more additional dimension keys;
    aggregate a single resultant set comprising all of the one or more dimension keys and all of the one or more additional dimension keys, the single resultant set aggregated without rebuilding the format comprising one or more dimension keys in the database;
    construct a multidimensional cube with the one or more original dimension keys and the one or more additional dimension keys, thereby reducing computational run time of the computer; and
    store the multidimensional cube in a storage device.

11. A system of linking one or more discrete dimensions through the use of a constructed multidimensional cube to improve performance of computer processing operations, the system comprising:

one or more computers comprising a processor and a memory, the one or more computers configured to:

collect base data from one or more entities and stores the base data in a format comprising one or more dimension keys;

provide a set of templates that define one or more rule sets, the one or more rule sets identify criteria in the base data for subsequent tagging and associating an instance of at least one of the one or more dimension keys with an instance of at least one of one or more additional dimension keys;

when base data is incompatible with the one or more rule sets defined by the set of templates, translate base data to a compatible data structure;

compare one or more records of the base data with the criteria of the one or more rule sets to determine whether the one or more records of the base data meet the criteria of the one or more rule sets, wherein meeting the criteria of the one or more rule sets triggers a tagging of the one or more records;

tag one or more records of the base data that meet the criteria of the one or more rule sets with one or more additional dimension keys;

aggregate a single resultant set comprising all of the one or more dimension keys and all of the one or more additional dimension keys, the single resultant set aggregated without rebuilding the stored base data format comprising one or more dimension keys; and construct and store in a storage device a multidimensional cube with the one or more original dimension keys and the one or more additional dimension keys, thereby reducing computational run time of the computer.

12. The system of claim 11, further comprising a plug-n-play dimension module that allows adding dimension keys.

13. The system of claim 11, wherein a plug-n-play dimension module allows modification of the one or more additional dimension keys.

14. The system of claim 11, wherein a plug-n-play dimension module allows modification of the one or more original dimension keys.

15. The system of claim 11, wherein the multidimensional cube can be viewed on a user interface from one or more different viewpoints.

16. The system of claim 11, further comprising a user interface that allows different dimensions to be selected.

17. The system of claim 11, wherein a dimension is seasonality.

18. The method of claim 11, wherein the base data includes information comprising one or more of SKU, outlet, time frame, sales, price and date.

19. A method of creating a data structure representing product or service information in the form of a cube having dimensions to improve performance of computer processing operations, the method comprising:

receiving base data from one or more information sources;

providing a set of templates that define one or more rule sets, the one or more rule sets identify criteria in the base data for subsequent tagging and associating an instance of at least one of the one or more dimension keys with an instance of at least one of one or more additional dimension keys;

when base data is incompatible with the one or more rule sets defined by the set of templates, translating base data to a compatible data structure;

comparing one or more records of the base data with the criteria of the one or more rule sets to determine whether the one or more records of the base data meet the criteria of the one or more rule sets, wherein meeting the criteria of the one or more rule sets triggers a tagging of the one or more records;

tagging one or more records of the base data that meet the criteria of the one or more rule sets with one or more additional dimension keys;

constructing and storing in memory a multidimensional cube including the one or more additional dimension keys, without rebuilding the information source, thereby reducing computational run time of the computer; and providing the multidimensional cube for slice-and-dice analysis.

* * * * *